(12) United States Patent
Schildkraut et al.

(10) Patent No.: US 9,934,597 B2
(45) Date of Patent: Apr. 3, 2018

(54) METAL ARTIFACTS REDUCTION IN CONE BEAM RECONSTRUCTION

(71) Applicant: Carestream Health, Inc., Rochester, NY (US)

(72) Inventors: Jay S. Schildkraut, Rochester, NY (US); Lawrence A. Ray, Rochester, NY (US); Krishnamoorthy Subramanyan, Palatine, IL (US)

( * ) Notice: Subject to any disclaimer, the term of this patent is extended or adjusted under 35 U.S.C. 154(b) by 65 days.

(21) Appl. No.: 14/483,266

(22) Filed: Sep. 11, 2014

(65) Prior Publication Data

US 2016/0078647 A1    Mar. 17, 2016

(51) Int. Cl.
*G06T 11/00* (2006.01)

(52) U.S. Cl.
CPC .................................. *G06T 11/005* (2013.01)

(58) Field of Classification Search
None
See application file for complete search history.

(56) References Cited

U.S. PATENT DOCUMENTS

| | | | |
|---|---|---|---|
| 5,270,926 A | 12/1993 | Tam | |
| 5,999,587 A | 12/1999 | Ning et al. | |
| 7,636,461 B2 * | 12/2009 | Spies | G06T 11/008 382/128 |
| 8,233,586 B1 * | 7/2012 | Boas | G06T 11/005 378/207 |
| 2006/0020200 A1 * | 1/2006 | Medow | A61B 6/032 600/425 |
| 2008/0165920 A1 * | 7/2008 | De Man | A61B 6/5282 378/17 |
| 2009/0175562 A1 * | 7/2009 | Pan | A61B 6/032 382/312 |
| 2011/0081071 A1 * | 4/2011 | Benson | G06T 11/005 382/154 |
| 2013/0070991 A1 * | 3/2013 | Yang | G06T 11/008 382/131 |

(Continued)

OTHER PUBLICATIONS

Barrett et al., "Artifacts in CT: Recognition and Avoidance," RadioGraphics 2004; 24:1679-1691.*

(Continued)

*Primary Examiner* — Matthew Bella
*Assistant Examiner* — Soo Shin
(74) *Attorney, Agent, or Firm* — Thompson Hine LLP

(57) ABSTRACT

A method for reducing metal artifacts in a volume radiographic image reconstructs a first 3-D-image using measured projection images and forms a 3-D image metal mask that contains metal voxels. For each measured projection image, a projection metal mask is a projection of the 3-D image metal mask. A 3-D prior image contains voxels within the 3-D image metal mask. Voxel values of the first 3-D image outside the 3-D image metal mask are replaced with a value representative of air or soft tissue. Non-metal voxels of the 3-D prior image are modified according to a difference between a pixel value related to the nonmetal voxel and the corresponding pixel value in a calculated projection image. Composite projection images are formed by replacing measured projection image data for pixels within the projection metal mask with calculated projection image data. A metal artifact reduced 3-D image is reconstructed from composite projections.

11 Claims, 12 Drawing Sheets

(56) References Cited

U.S. PATENT DOCUMENTS

2014/0328450 A1* 11/2014 Pal .................. G01N 23/046
378/5

OTHER PUBLICATIONS

Meilinger et al., "Metal artifact reduction in CBCT using forward projected reconstruction information and mutual information realignment," O. Dössel and W.C. Schlegel (Eds.): WC 2009, IFMBE Proceedings 25/II, pp. 46-49, 2009.*
Wang et al., "Iterative X-ray Cone-Beam Tomography for Metal Artifact Reduction and Local Region Reconstruction," Microsc. Microanal. 5, 58-65, 1999.*
Zhang et al., "Reducing metal artifacts in cone-beam CT images by preprocessing projection data," Int. J. Radiation Oncology Biol. Phys., vol. 67, No. 3, pp. 924-932, 2007.*

* cited by examiner

METAL ARTIFACTS REDUCTION IN CONE BEAM RECONSTRUCTION

FIELD OF THE INVENTION

The invention relates generally to the field of medical imaging and in particular to image reconstruction methods for Cone-Beam Computed Tomography (CBCT) imaging. More specifically, the invention relates to a method for improving CBCT results by reducing metal artifacts in the reconstructed image.

BACKGROUND OF THE INVENTION

3-D volume imaging can be a valuable diagnostic tool that offers significant advantages over earlier 2-D radiographic imaging techniques for evaluating the condition of teeth, bones, and other internal structures and organs. 3-D imaging of a patient or other subject has been made possible by a number of advancements, including the development of high-speed imaging detectors, such as digital radiography (DR) detectors that enable multiple images to be taken in rapid succession.

Cone beam computed tomography (CBCT) or cone beam CT technology offers considerable promise as one type of diagnostic tool for providing 3-D volume images. Cone beam X-ray scanners are used to produce 3-D images of medical and dental patients for the purposes of diagnosis, treatment planning, computer aided surgery, etc. Cone beam CT systems capture volume data sets by using a high frame rate flat panel digital radiography (DR) detector and an x-ray source, typically affixed to a gantry that revolves about the subject to be imaged. The CT system directs, from various points along its orbit around the subject, a divergent cone beam of x-rays through the subject and to the detector. The CBCT system captures projection images throughout the source-detector orbit, for example, with one 2-D projection image at every degree increment of rotation. The projections are then reconstructed into a 3-D volume image using various techniques. Among the most common methods for reconstructing the 3-D volume image from 2-D projections are filtered back projection (FBP) and Feldkamp-Davis-Kress (FDK) approaches.

Although 3-D images of diagnostic quality can be generated using CBCT systems and technology, a number of technical challenges remain. Highly dense objects, such as metallic implants, appliances, surgical clips and staples, dental fillings, and the like can cause various image artifacts that can obscure useful information about the imaged tissue. Dense objects, having a high atomic number, attenuate X-rays in the diagnostic energy range much more strongly than do soft tissue or bone features, so that far fewer photons reach the imaging detector through these objects. For 3-D imaging, the image artifacts that can be generated by metallic and other highly dense objects include dark and bright streaks that spread across the entire reconstructed image. Such artifacts can be due to physical effects such as high noise, radiation scatter, beam hardening, the exponential edge-gradient effect, aliasing, and clipping, and non-linear amplification in FBP or other reconstruction methods. The image degradation commonly takes the form of light and dark streaks in soft tissue and dark bands around and between highly attenuating objects. These image degradations are commonly referred to as artifacts because they are a result of the image reconstruction process and only exist in the image, not in the scanned object. These artifacts not only conceal the true content of the object, but can be mistaken for structures in the object. Artifacts of this type can reduce image quality by masking other structures, not only in the immediate vicinity of the dense object, but also throughout the entire image. At worst, this can falsify CT values and even make it difficult or impossible to use the reconstructed image effectively in assessing patient condition or for planning suitable treatment.

A number of approaches have been tried for metal artifacts reduction (MAR), with varying success and some shortcomings. Among the basic types of approaches that have been used are the following:

1. Interpolation-based FBP reconstruction approach. This approach operates in the projection domain, where the metal shadow is identified and obscured values are interpolated or in-painted using the data values of nonmetal-contaminated neighboring region. For some types of imaging, with a single metal object within a relatively homogeneous volume, this method works acceptably. However, in more complex heterogeneous tissue, particularly where there are multiple metal objects in a heterogeneous volume, the interpolation-based algorithm can make unrealistic assumptions about the region that lies in the shadow of the metal, leading to pronounced errors in the reconstructed images. It is generally held, in the 3-D imaging arts, that interpolation-based repair of the projections is based on a weak underlying model. Hence, it cannot be expected that the estimated projection data will suitably fit the projection data measured without metal objects.

2. Iterative reconstruction approach. Generally improved over the performance of interpolation-based FBP of approach 1, the iterative reconstruction approach uses the regions of the projections that are not contaminated by metal and other highly attenuating material in the reconstruction. The 3-D image is iteratively updated in order to converge on an image that, upon forward projection, results in calculated projections that closely match the measured projections outside of the metal shadow. A drawback of this approach is that the metal in the scanned object does not appear in the reconstruction and has to be added to the 3-D image in a subsequent step. Also, the reconstructed 3-D image is improved if, in the reconstruction process, the metal shadow regions of the projections are restored instead of neglected.

3. Prior image approach. In the prior image approach an initial reconstructed 3-D image is created. This is followed by a step in which metal artifacts are removed from the initial reconstruction to create a "prior" image. This prior image cannot serve as the final metal artifact reduced 3-D image because in the artifact reduction step significant image content is also removed. The prior image is used for the purpose of producing calculated projections which are merged into the measured projections in the metal shadow regions. The resultant composite projection images are then used to reconstruct the final artifact reduced 3-D image.

Dental volume imaging can be particularly challenging because of the relative complexity of structures and shapes and because objects of very different densities are closely packed together in a relative small space. Various types of fillings, implants, crowns, and prosthetic devices of different materials can be encountered during the scan. Beam hardening effects can also impact image quality. Thus, metal artifacts reduction can be particularly difficult for dental volume imaging.

The reduction of artifacts that are caused by metal and other highly attenuating objects is valued for a number of reasons, particularly with the use of implants is growing in medical and dental treatments. Although some progress has been made to form volume image data that distinguishes features of different densities, there is still considerable room for improvement and a need for a method of metal artifacts reduction that offers improved performance and computational efficiency.

SUMMARY OF THE INVENTION

An aspect of this application is to advance the art of medical dental digital radiography.

Another aspect of this application is to address, in whole or in part, at least the foregoing and other deficiencies in the related art.

It is another aspect of this application to provide, in whole or in part, at least the advantages described herein.

It is an object of the present invention to advance the art of volume imaging and provide improved ways to reduce metal artifacts in CBCT volume images. Processing is provided in both the volume and projection domains, providing improved results over other artifact-reduction methods.

Embodiments of the present disclosure provides automated methods that help to reduce streaking and other effects in the volume image that can result from metal artifacts. Information on underlying tissues in the volume image is retained following artifact reduction processing.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a method for reducing metal artifacts in a volume radiographic image, the method executed at least in part on a computer and comprising:

reconstructing a first 3-D-image using measured projection images;

forming a 3-D image metal mask that contains metal voxels in the first 3-D image;

for each measured projection image, forming a projection metal mask that contains the pixels that are a projection of the 3-D image metal mask;

forming a 3-D prior image that contains the voxels of the first 3-D image that are within the 3-D image metal mask and replacing voxel values of the first 3-D image that are outside the 3-D image metal mask with a value that is representative of air or soft tissue;

iteratively modifying one or more of the non-metal voxels of the 3-D prior image according to a difference between a pixel value related to the nonmetal voxel in at least one measured projection image at a projection angle and the corresponding pixel value in at least one calculated projection image that is generated for the projection angle according to the 3-D prior image;

forming a plurality of composite projection images, wherein each composite projection image is formed by replacing measured projection image data for pixels within the projection metal mask with calculated projection image data for the corresponding pixels; and reconstructing a metal artifact reduced 3-D image from the plurality of composite projections.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIG. 9A shows a measured projection.

FIG. 9B shows a metal projection from the measured projection of FIG. 9A.

FIG. 9C shows a projection metal mask from the metal projection of FIG. 9B.

DETAILED DESCRIPTION OF EXEMPLARY EMBODIMENTS

Figure 1:
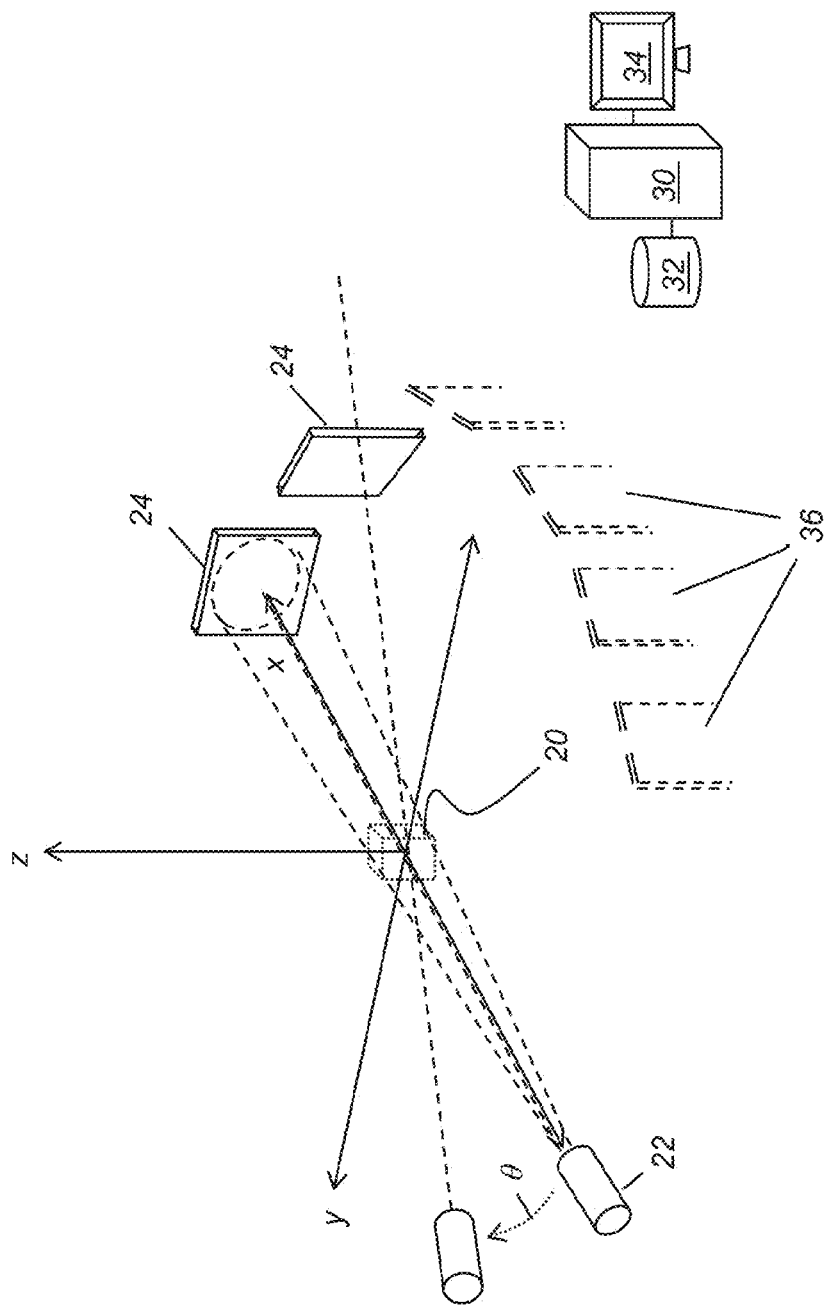
FIG. 1 is a block diagram schematic that shows how projection images are obtained.

The following is a detailed description of exemplary embodiments of the invention, reference being made to the drawings in which the same reference numerals identify the same elements of structure in each of the several figures.

In the drawings and text that follow, like components are designated with like reference numerals, and similar descriptions concerning components and arrangement or interaction of components already described are omitted. Where they are used, the terms "first", "second", and so on, do not necessarily denote any ordinal or priority relation, but are simply used to more clearly distinguish one element from another.

In the context of the present disclosure, the term "volume image" is synonymous with the terms "3-dimensional image" or "3-D image". Embodiments of the present invention are particularly well suited for suppressing the types of metal artifacts that occur in 3-D volume images, including cone-beam computed tomography (CBCT) as well as fan-beam CT images.

For the image processing steps described herein, the terms "pixels" for picture image data elements, conventionally used with respect 2-D imaging and image display, and "voxels" for volume image data elements, often used with respect to 3-D imaging, can be used interchangeably. It should be noted that the 3-D volume image is itself synthesized from image data obtained as pixels on a 2-D sensor array and displays as a 2-D image from some angle of view. Thus, 2-D image processing and image analysis techniques can be applied to the 3-D volume image data. In the description that follows, techniques described as operating upon pixels may alternately be described as operating upon the 3-D voxel data that is stored and represented in the form of 2-D pixel data for display. In the same way, techniques that operate upon voxel data can also be described as operating upon pixels.

In the context of the present disclosure, the noun "projection" may be used to mean "projection image", referring to the 2-D image that is captured and used to reconstruct the volume image. In addition, "projection" can also refer to calculated projections for a simulated cone beam system that are obtained by calculating the attenuation of X-rays as they propagate through a 3-D image volume.

An object of embodiments of the present disclosure is to provide a method for reducing artifacts in X-ray cone beam reconstructions that are caused by metal and other highly X-ray attenuating materials such as those used for implants that are placed within the body. In the context of the present disclosure, high-density objects that cause what is commonly known as metal artifacts in the volume image are termed "metal" objects. This includes objects formed from materials having a relatively high attenuation coefficient. The attenuation coefficient for a material is not a fixed value, but varies and is dependent, in part, on the photon energy level. An exemplary metal object of titanium, for example, has an attenuation coefficient of about 0.8 $cm^{-1}$ in the 80 KeV range. Bone has a typical attenuation coefficient of about 0.6 $cm^{-1}$ in the 80 KeV range. Any object having attenuation at or near that of titanium or higher can be considered to be a metal object. It should be noted, for example, that objects formed from some types of highly dense composite materials can have a similar effect on image quality as objects formed from metal or alloys. The methods of the present invention address the type of artifact generated by such objects, of whatever material type or other composition. Materials commonly used and known to cause at least some type of "metal artifact" in radiographs and volume images include metals such as iron, cobalt, chromium, titanium, tantalum, and alloys including cobalt chromium alloys, for example, as well as some ceramic compositions and various composite materials such as high density composite plastics. Examples of typical implants include various types of prostheses, pins, plates, screws, nails, rods, caps, crowns, bridges, fixtures, braces, dentures, fillings, etc. The implants are usually comprised of metal and/or ceramic material.

CBCT imaging apparatus and the imaging algorithms used to obtain 3-D volume images using such systems are well known in the diagnostic imaging art and are, therefore, not described in detail in the present application. Some exemplary algorithms and approaches for forming 3-D volume images from the source 2-D images, projection images that are obtained in operation of the CBCT imaging apparatus can be found, for example, in the teachings of U.S. Pat. No. 5,999,587 entitled "Method of and System for Cone-Beam Tomography Reconstruction" to Ning et al. and of U.S. Pat. No. 5,270,926 entitled "Method and Apparatus for Reconstructing a Three-Dimensional Computerized Tomography (CT) Image of an Object from Incomplete Cone Beam Data" to Tam.

In typical applications, a computer or other type of dedicated logic processor for obtaining, processing, and storing image data is part of the CBCT system, along with one or more displays for viewing image results. A computer-accessible memory is also provided, which may be a memory storage device used for longer term storage, such as a device using magnetic, optical, or other data storage media. In addition, the computer-accessible memory can comprise an electronic memory such as a random access memory (RAM) that is used for shorter term storage, such as employed to store a computer program having instructions for controlling one or more computers to practice the method according to the present invention.

In order to more fully understand the methods of the present invention and the problems addressed, it is instructive to review principles and terminology used for CBCT image capture and reconstruction. Referring to the perspective view of FIG. 1, there is shown, in schematic form and using enlarged distances for clarity of description, the activity of a conventional CBCT imaging apparatus for obtaining the individual 2-D projection images 36 that are used to form a 3-D volume image. A cone-beam radiation source 22 directs a cone of radiation toward a subject 20, such as a patient or other subject. A sequence of images is obtained in rapid succession at varying projection angles θ about the subject, such as one image at each 1-degree angle increment in a 200-degree orbit. A DR detector 24 is moved to different imaging positions about subject 20 in concert with corresponding movement of radiation source 22. FIG. 1 shows a representative sampling of DR detector 24 positions to illustrate how these images are obtained relative to the position of subject 20. Once the needed 2-D projection images are captured in this sequence, a suitable imaging algorithm, such as filtered back projection (FBP) or other conventional technique, is used for generating the 3-D volume image. Image acquisition and program execution are performed by a computer 30 or by a networked group of computers 30 that are in image data communication with DR detectors 24. Image processing and storage is performed using a computer-accessible memory 32. The 3-D volume image can be presented on a display 34.

FBP is a discrete implementation of an analytic model that assumes that CT transmission measurements are linear functions of the attenuation line integrals along the corresponding primary photon trajectories through the subject and are noiseless. When scanning subjects that comprise anatomically native materials under normal conditions, relatively simple corrections to the raw projection data are sufficient to assure that these assumptions (e.g., linear relationship) are at least approximately true. This treatment allows FBP images that are relatively free of visually observable artifacts. This situation is altered, however, when foreign materials are introduced. In regions shadowed by highly dense, attenuating objects such as metal, there is typically a dramatic increase in noise and nonlinear detector response due to scatter, beam hardening, and photon starvation. This gives rise to pronounced streaking artifacts. Mismatches between the simplified FBP model of detector response and the physical process of signal acquisition when metal objects are in the scanning field of view are the main source of those metal artifacts. An accurate physical model of the CT signal acquisition process is useful to mitigate the metal artifacts based on FBP reconstruction.

Figure 2:
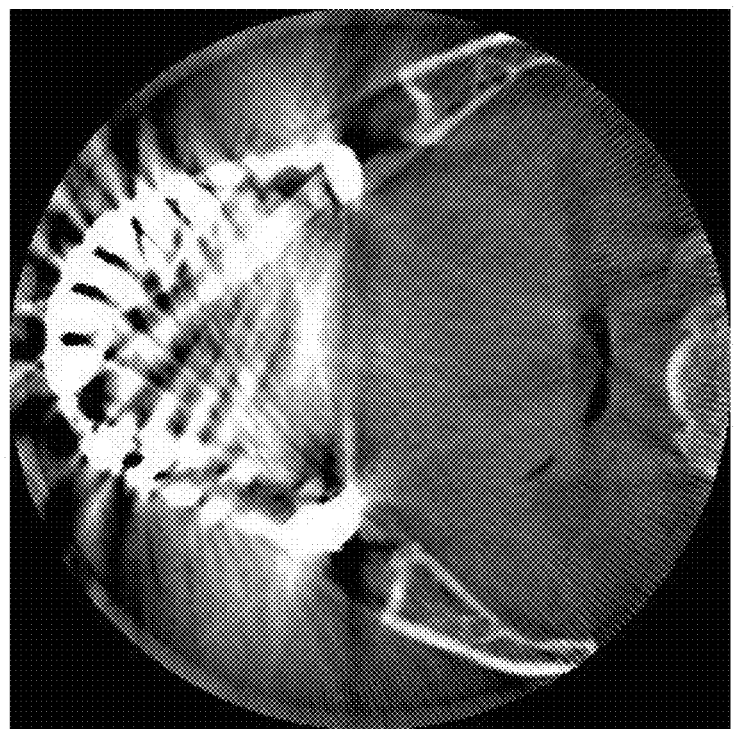
FIG. 2 shows an image slice that exhibits metal artifacts.

FIG. 2 shows an example image slice from a reconstructed dental image volume that exhibits metal artifacts. Fillings or other highly dense restoration components in the teeth cause the characteristic streaking and excessively dark regions that appear in this image.

Embodiments of the present disclosure reduce metal artifacts by creating a reconstruction or 3-D image metal mask that indicates the location of metal voxels in a first reconstruction and by forming a projection metal mask which indicates the pixel location of the metal voxels in the projection images that were captured by the cone beam CT scanner. This provides a framework for generating calculated projections that are artifact-free and that have diminished metal content. These calculated projections are combined with the captured or measured projections to form composite projections. When the composite projections are reconstructed, the resultant image has greatly reduced metal artifacts.

The image capture process described with respect to FIG. 1 obtains a plurality of measured projection images, each at a specific projection angle. Forward projection through the 3-D image metal mask provides a plurality of calculated projection images. One goal of iterative processing for suppressing metal artifacts as described in the present disclosure is to modify prior volume image data using both calculated and measured projection data.

Figure 3:
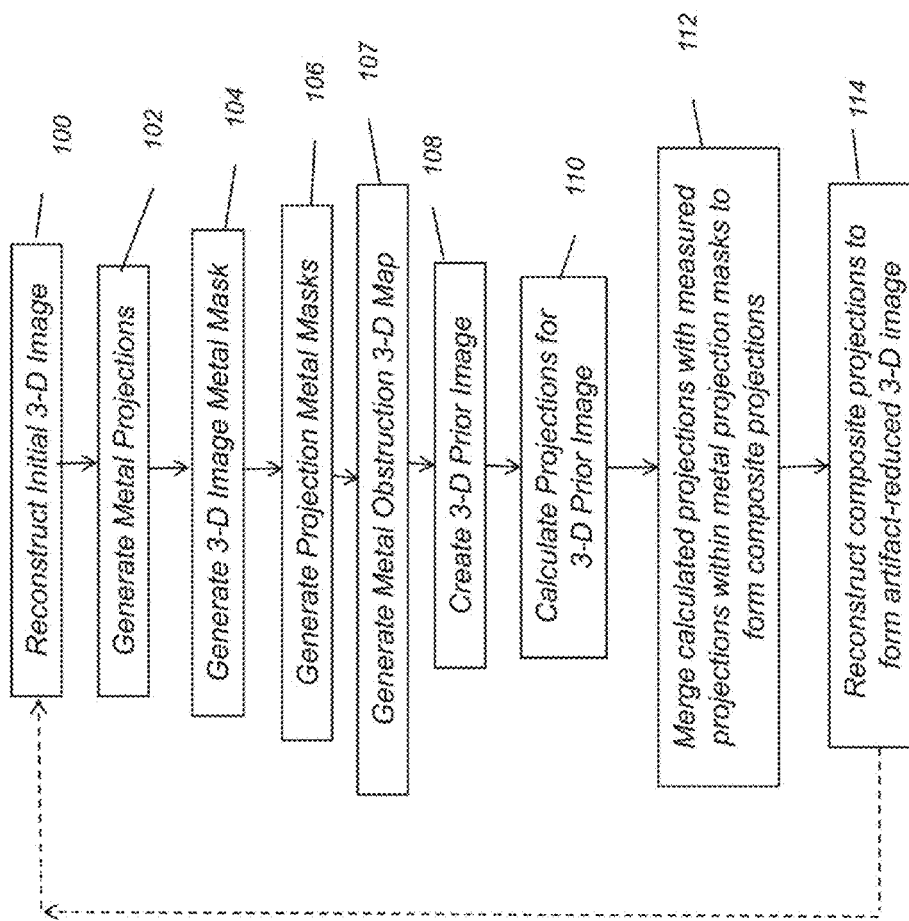
FIG. 3 is a logic flow diagram that shows a sequence for reducing metal artifacts according to an embodiment of the present disclosure.

The logic flow diagram of FIG. 3 shows an image processing sequence for CBCT reconstruction that includes processing to suppress metal artifacts. In a reconstruction step 100 an initial 3-D image is produced by reconstructing the measured projections that are obtained from the cone beam CT scanner. In a metal projection generation step 102 a metal projection image is generated for each of the measured projection images. The metal projection image records the attenuation that is due to metal at each projection image pixel. Notably, this value can vary from one pixel to the next based on factors such as amount of metal, proximity to a metal feature, and projection angle. In a metal mask generation step 104 a 3-D image metal mask is formed. The 3-D image metal mask indicates which voxels in the initial 3-D image that contain metal appear to cause artifacts. The 3-D image metal mask is then used to create projection metal masks in a projection metal mask generation step 106. The projection metal masks indicate pixels in the measured projections that are significantly affected by the presence of metal in the scanned object. Note that the 3-D image metal mask and projection metal masks may not include all of the metal in the object; some smaller concentrations of metal may be shaped, situated, or sized in such a way that they cause no significant artifacts in the reconstructed image.

As explained in more detail subsequently, the 3-D image metal mask from step 104 and 2-D projection metal masks from step 106 are consistent with each other: forward projection of the 3-D image metal mask results in the calculated 2-D projection metal masks.

In a metal obstruction 3-D mapping step 107, the 2-D projection metal masks from step 106 are used to determine the extent to which each voxel in the 3-D image is obstructed by metal. One measure of metal obstruction is obtained by attenuating each ray that extends from the X-ray source to a projection pixel by the metal density at that pixel that is calculated in step 102. For example, the attenuation factor exp(−C D) may be used where D is the metal density at the projection pixel and C is a constant that determines the contrast of the metal obstruction measure. All rays are back-projected to create a 3-D map of metal obstruction.

In a 3-D prior image generation step 108 in FIG. 3 a 3-D prior image is generated using the measured projections, initial 3-D image, 3-D image metal mask, 2-D projection metal masks, and metal obstruction 3-D map. As explained in more detail subsequently, this image is formed using a method that reduces metal artifacts and also assures that calculated projections that are generated from forward projection using this image closely match the measured projections for pixels lying outside of the projection metal masks.

In a projections calculation step 110, forward projections are calculated for the 3-D prior image 108, as described in more detail subsequently. In a composite projection generation step 112 in FIG. 3, composite projections are produced by replacing a region of each measured projection, within its corresponding projection metal mask, with pixels of its corresponding calculated projection from step 110. Finally, in a reconstruction step 114 the composite projections from step 112 are reconstructed to create a metal artifact reduced 3-D image. One or more repeated iterations of steps 100 through 114 can serve to provide an improved 3-D volume image with reduced metal artifacts. Advantageously, embodiments of the present disclosure help to remove metal artifacts without introducing new artifacts.

Figure 4:
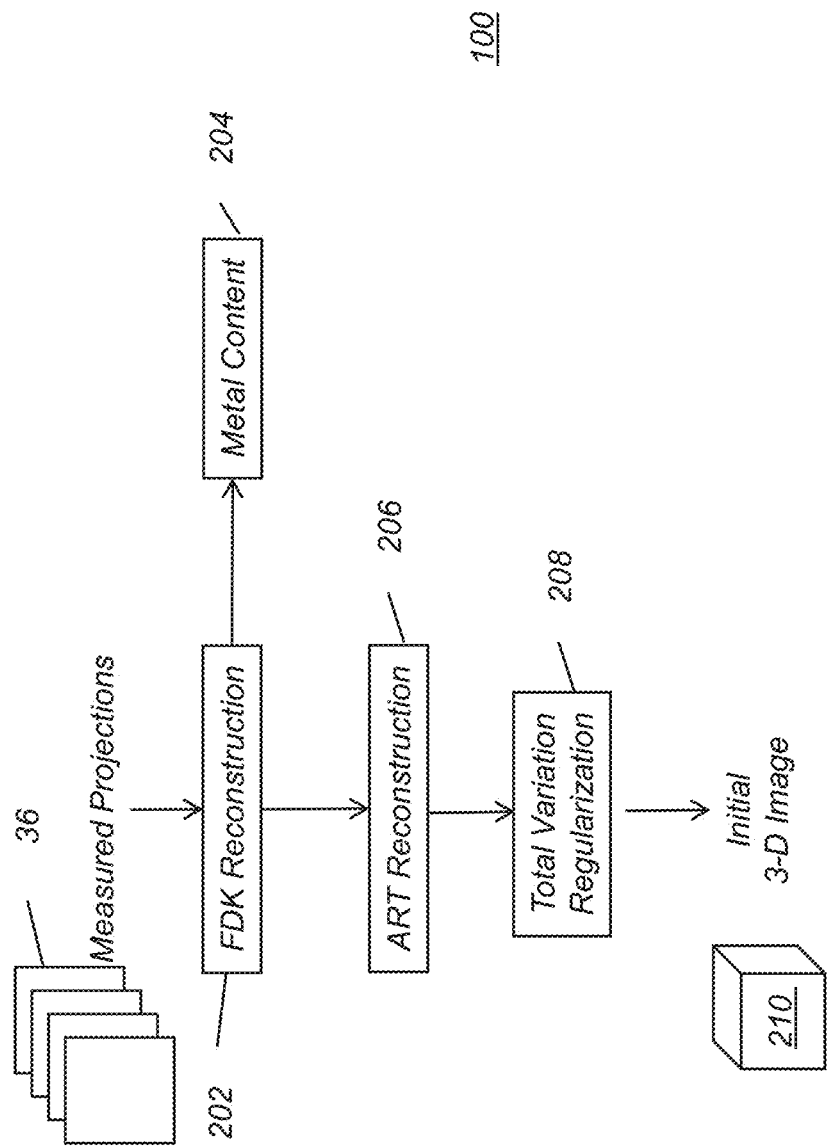
FIG. 4 is a logic flow diagram showing a sequence for reconstructing the initial 3-D image from projection images.

Subsequent FIGS. 4-8 describe portions of the processing sequence shown in FIG. 3 in more detail. The logic flow diagram of FIG. 4 shows steps in the creation of the initial 3-D image in reconstruction step 100. The measured projection images 36 are the actual projection images that are obtained from the digital detector 24 at different projection angles as described with reference to FIG. 1. A volume image is reconstructed from the measured projection images 36 using an FDK cone beam reconstruction algorithm, or other type of reconstruction, in a reconstruction step 202. At this stage, in an assessment step 204, the relative amount of metal content of the object can be approximately calculated in order to determine if the metal artifact reduction method in this invention needs to be applied. For example, the number (or fraction) of voxels with an attenuation coefficient that exceeds a predetermined threshold can be a suitable metric to determine whether or not significant metal exists in the scanner object. Where there is insufficient metal content, metal artifact reduction is not needed and processing exits this procedure. In addition, the region of the measured projection images 36 that are affected by metal is determined in assessment step 204. According to an embodiment of this disclosure, only those parts of the measured projection that are affected by metal are processed in order to decrease processing time.

In a reconstruction step 206 of FIG. 4, an algebraic reconstruction technique (ART) or other reconstruction is performed starting with the 3-D image that is produced by reconstruction step 202. Algebraic reconstruction is designed to produce a reconstruction that, upon forward projection, yields calculated projections that closely match the measured projections. In a regularization step 208 a total variation regularization algorithm is applied to the 3-D image in order to reduce noise. A resultant 3-D image 210, labeled as the initial or first 3-D image, is now suitable for the creation of metal masks.

Total variation regularization, also termed total variation denoising, uses the principle that the integral of the absolute gradient of the noise signal is generally high. Selectively reducing the total variation of the signal can remove unwanted detail without loss of edges or other high-gradient detail. Methods for total variation regularization are available and are familiar to those skilled in the diagnostic image processing arts.

Figure 5:
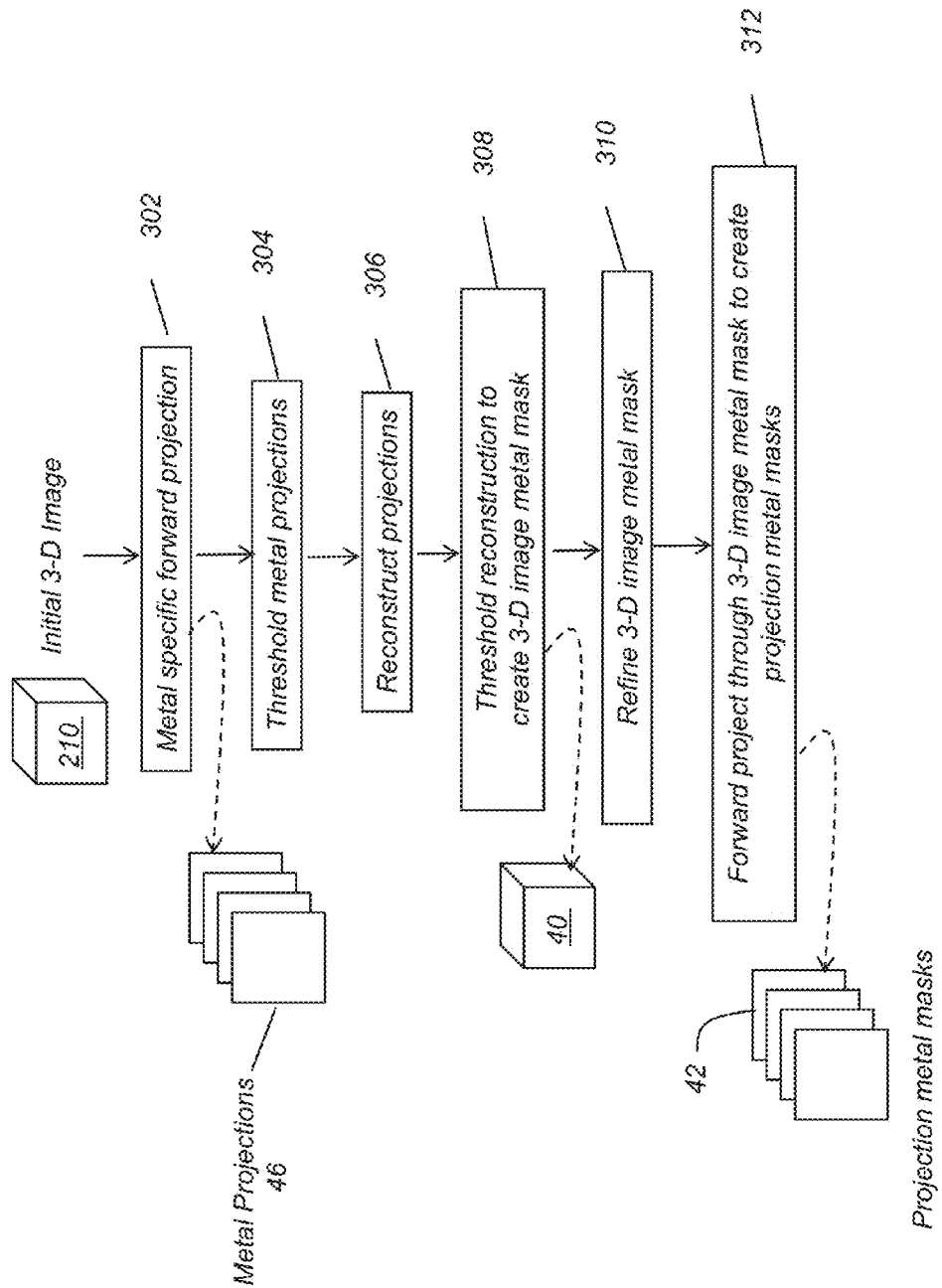
FIG. 5 is a logic flow diagram showing a sequence for generating projection metal masks.

A method for metal mask generation (step 106 in FIG. 3) is shown in FIG. 5. In a forward projection step 302, forward projections are performed on the initial 3-D image 210, so that the calculated projections record attenuation that is predominantly due to metal, to form metal projections 46. In a thresholding step 304, metal projection 46 pixels are set to zero if the corresponding attenuation value is below a threshold. This step is designed to remove, from the final metal mask, metal that does not significantly attenuate the X-rays, thus not causing artifacts. A reconstruction step 306 reconstructs a volume image using the metal projections from step 304. The FDK reconstruction algorithm is suitable for this purpose. The voxels of the reconstruction from step 306 are set to zero if the attenuation coefficient is below a threshold in a threshold reconstruction step 308. The result of step 308 is a 3-D image metal mask 40 which is further refined in a refinement step 310, described in more detail in FIG. 6. After refinement step 310, forward projection is performed through the 3-D image metal mask in a forward projection step 312 to form the projection metal masks 42.

Figure 6:
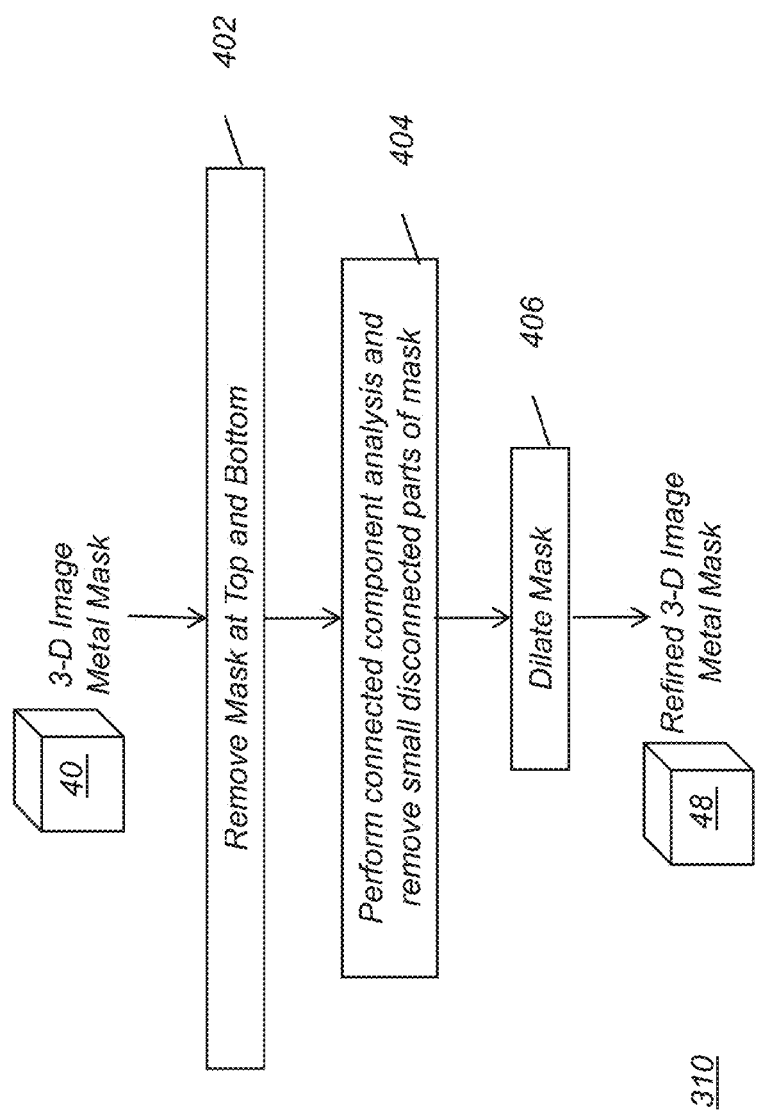
FIG. 6 is a logic flow diagram showing a sequence for generating a refined 3-D image metal mask.

FIG. 6 shows the sequence of steps that are used to refine the metal mask, as performed in refinement step 310 in FIG. 5. 3-D images that are created by cone beam reconstruction generally have stronger cone beam artifacts in planes that are more distant from the location of the X-ray source. For this reason, in a clipping step 402, the 3-D image metal mask is removed near the top and bottom (relative to an axis parallel to the axis of rotation of the x-ray source and detector). This means that the mask value that indicates the presence of metal is set to a non-metal value. In an analysis step 404, connected component analysis is performed on the 3-D image mask to locate small disconnected voxel regions that indicate the presence of metal. These regions are removed from 3-D image metal mask 40 because they contribute little to metal artifacts. In a dilation step 406, the 3-D image mask is dilated so that it includes slightly more than the metal volume. The result of the steps in FIG. 6 is a refined 3-D image mask 48.

Figure 7:
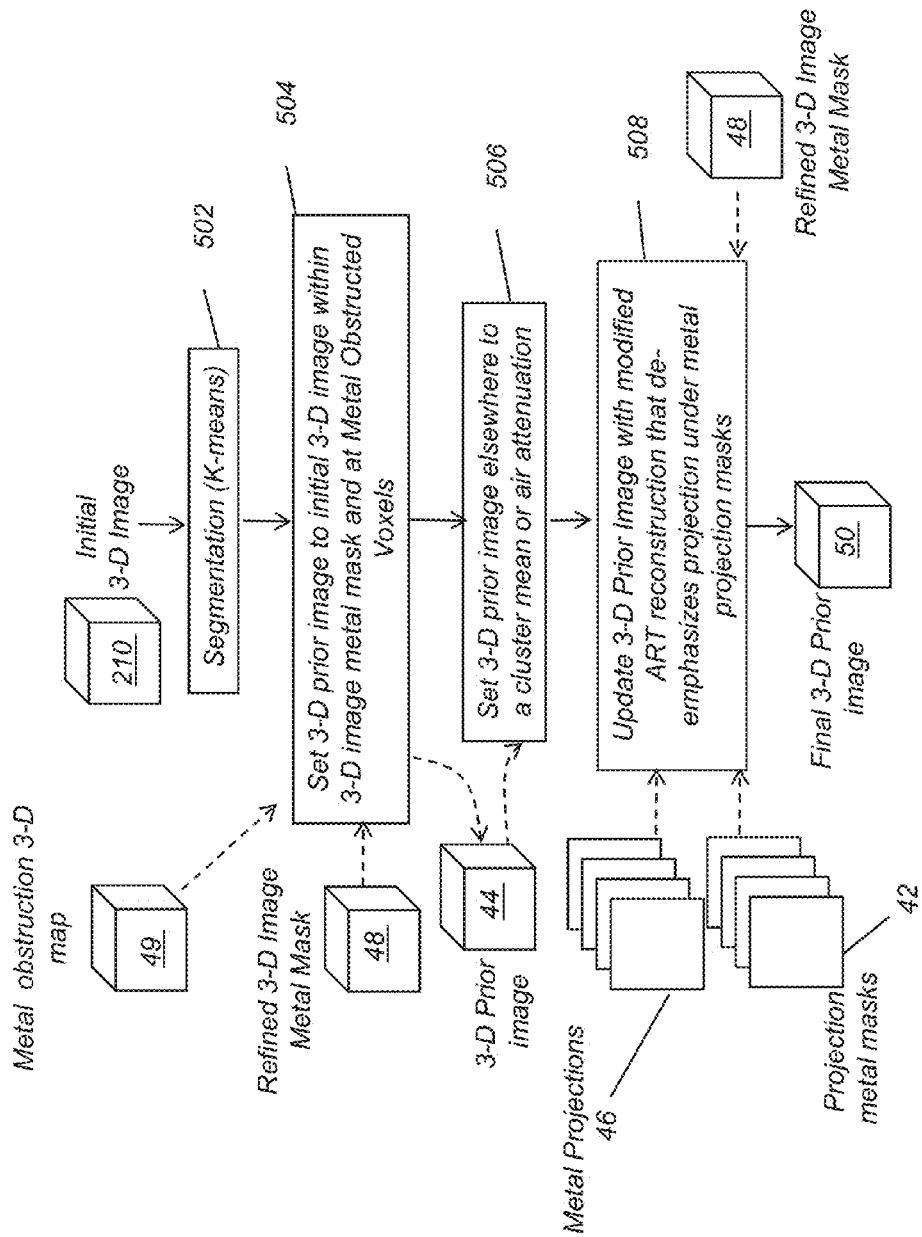
FIG. 7 is a logic flow diagram showing a sequence for generating a 3-D prior image according to an embodiment of the present disclosure.

FIG. 7 shows the steps that produce the 3-D prior image in prior image generation step 108 of FIG. 3. The initial 3-D image is segmented in a segmentation step 502. Using K-means segmentation or other suitable segmentation method, voxels in the image are classified according to relative density, such as air, soft tissue, bone, and metal, as indicated by the attenuation value calculated for the voxel as part of volume reconstruction. In an initialization step 504, a 3-D prior image 44 is initialized by setting voxels that are inside the refined 3-D image metal mask 48 and that have a metal obstruction value that exceeds a threshold, as indicated by the metal obstruction 3-D map 49, to the attenuation coefficient value of the corresponding voxel in the initial 3-D image 210.

In an adjustment step 506, the other voxel values in the 3-D prior image are set. According to an embodiment of the present disclosure, these voxels are clustered, then set to the mean value of the cluster. However, metal artifacts often make soft tissue and bone content in an object appear as air and, conversely, air and soft tissue to appear as bone or metal. For this reason, according to an alternate embodiment of the present disclosure, this type of misclassification of voxels is mitigated by setting all voxels that are not known a priori to be air to the soft tissue class mean.

Still referring to FIG. 7, in an update step 508 the 3-D prior image 44 is updated using an algebraic reconstruction method. In this reconstruction, the refined 3-D image metal mask 48 is used to prevent the voxels that were added in step 504 from being updated. The metal projections 46 and projection metal masks 42 are used to deemphasize projection pixels that are attenuated by metal in the reconstruction process. The reconstruction process in update step 508 corrects the attenuation coefficients from adjustment step 506 without introducing metal artifacts. Furthermore, the final 3-D prior image 50, when projected through in a subsequent step, produces calculated projections that closely match the measured projections outside of the projection metal masks.

Figure 8:
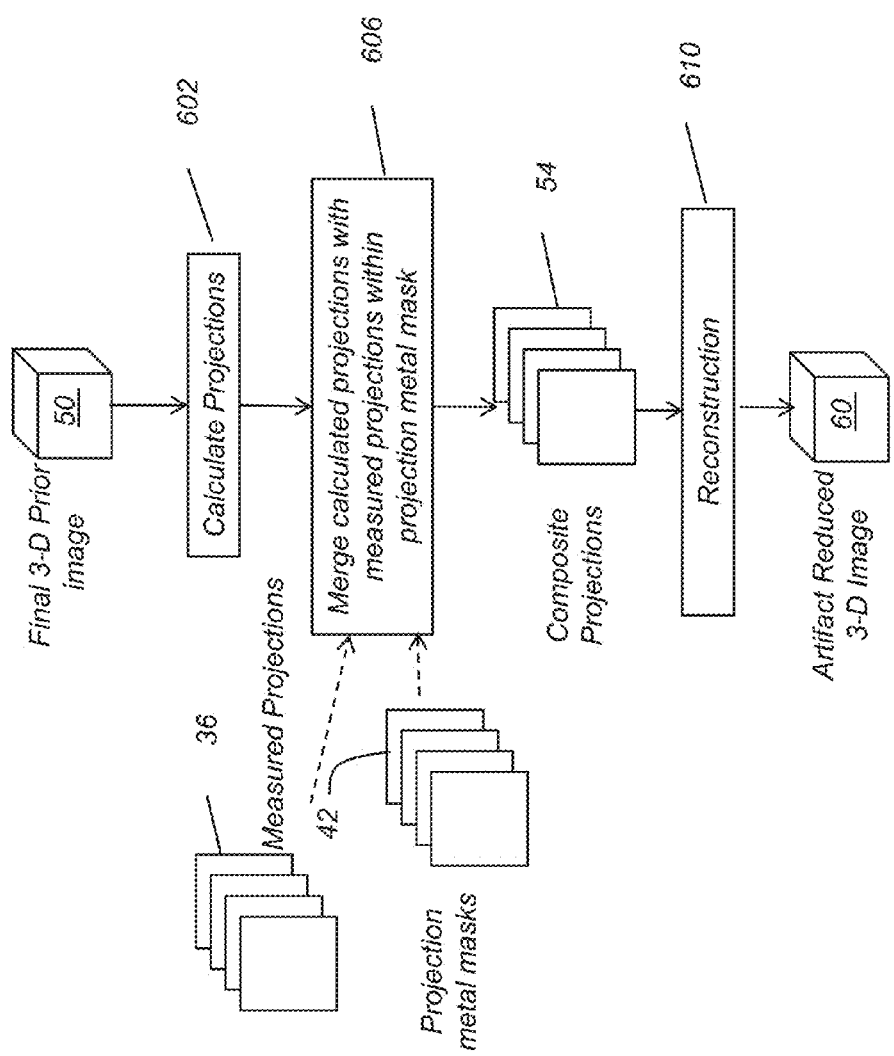
FIG. 8 is a logic flow diagram showing a sequence for forming an artifact-reduced 3-D image based on prior image data.

The logic flow diagram of FIG. 8 shows how an artifact reduced 3-D image 60 is formed. A forward projection step 602 calculates a set of calculated projections for the final 3-D prior image 50. In a combination step 606 the original measured projections 36 are merged with the calculated projections from step 602 within the projection metal masks 42 to produce composite projection images 54. In a reconstruction step 610 the composite projection images 54 are used for FDK reconstruction, although algebraic or other reconstruction methods could alternately be used. The desired result is artifact reduced 3-D image 60 that can be stored, transmitted, or displayed. The resulting artifact reduced 3-D image may be displayed for comparison along with a corresponding view of the original 3-D image that does not have artifact correction.

According to an alternate embodiment of the present invention, the artifact reduced 3-D image 60 from FIG. 8 is then used as the initial 3-D image 210 and the process from FIGS. 3-8 repeats for metal artifact reduction. This type of iteration, using an artifact reduced image 60 as the starting point of this method, can result in further metal artifact reduction.

By way of example, FIG. 9A shows a measured projection image 36 of a patient who has one or more metal objects 28 such as an implant, crown, or other prosthesis. FIG. 9B shows a metal projection 46 from the measured projection of FIG. 9A. FIG. 9C shows a projection metal mask 42 from the metal projection of FIG. 9B.

Figures 10A, 10B, 10C:
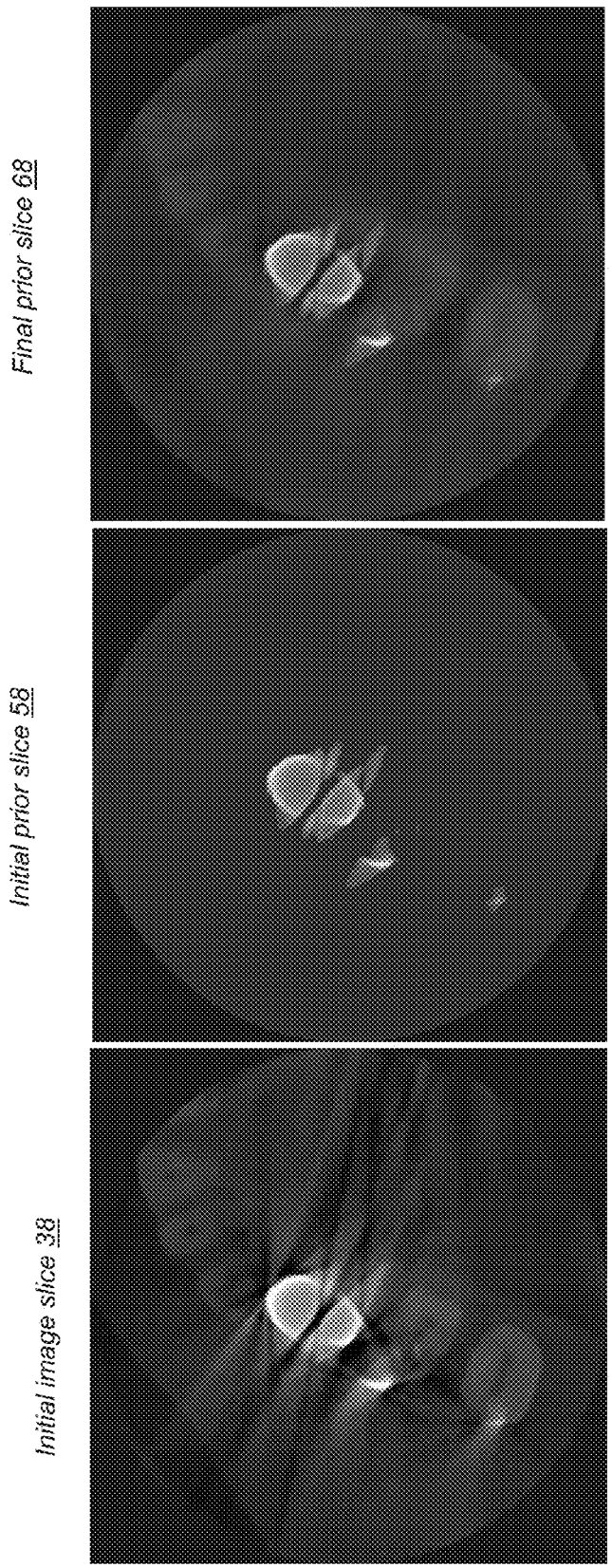
FIG. 10A shows an initial image obtained from a reconstruction, showing metal artifacts.
FIG. 10B shows an initial image obtained from a prior 3-D reconstruction.
FIG. 10C shows a final image obtained from processing the prior 3-D data according to an embodiment of the present disclosure.

FIG. 10A shows an image slice 38 taken from the initial 3-D image 210 obtained from the first reconstruction, showing metal artifacts. FIG. 10B shows an initial image slice 58 obtained from a 3-D prior image 44 reconstruction. FIG. 10C shows a final image slice 68 obtained from processing the prior 3-D data to generate a final 3-D prior image 50 according to an embodiment of the present disclosure.

Figure 11B:
FIG. 11B shows the projection image of FIG. 11A modified according to the metal artifacts reduction methods of the present disclosure.
Figure 11A:
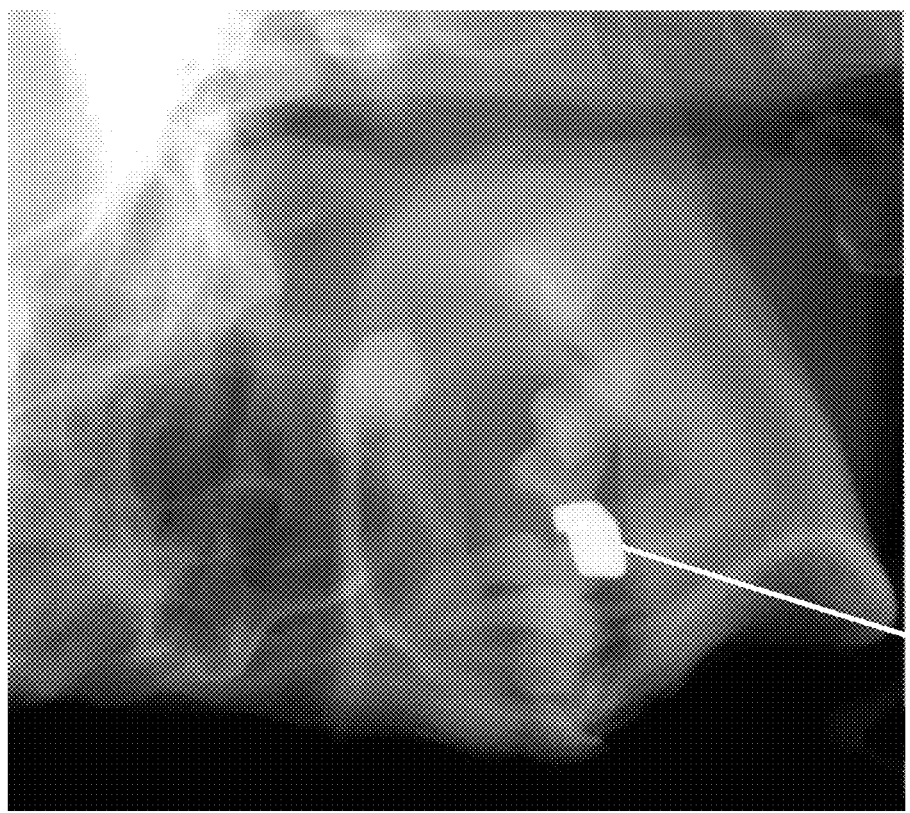
FIG. 11A shows a measured projection image in which the patient has a metal implant or other prosthesis.

FIG. 11A shows a measured projection image 36 in which the patient has a metal implant or other prosthesis. FIG. 11B shows the projection image of FIG. 11A modified to form composite projection image 54 according to the metal artifacts reduction methods of the present disclosure.

Figure 12B:
FIG. 12B shows an image slice corresponding to that of FIG. 12A following metal artifacts reduction using the methods of the present disclosure.
Figure 12A:
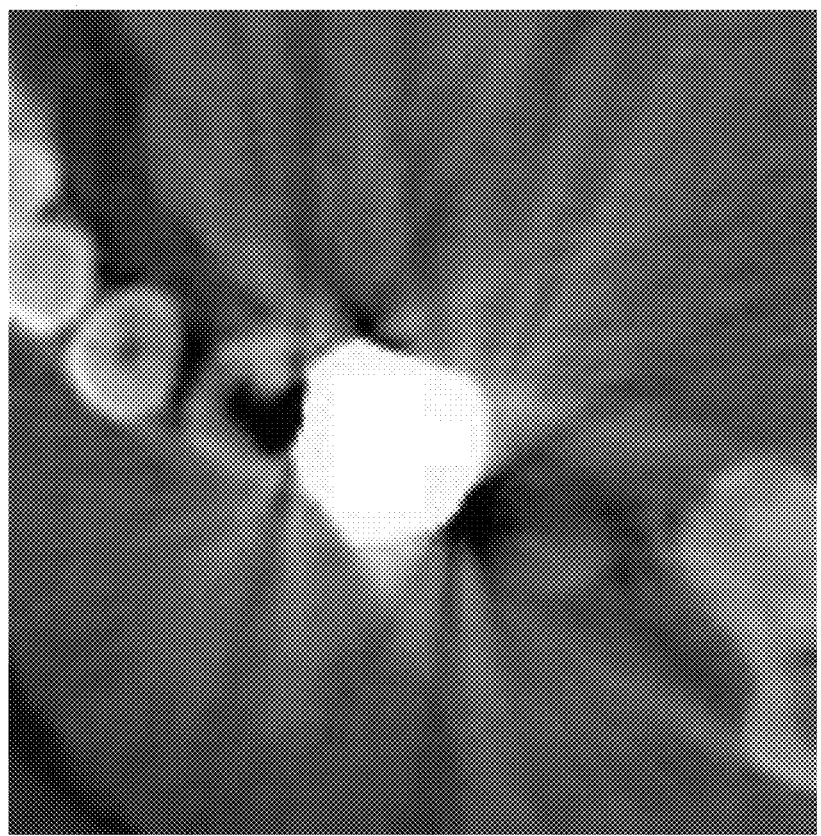
FIG. 12A shows an image slice from a reconstructed 3-D image that has metal artifacts.

FIG. 12A shows image slice 38 from a reconstructed 3-D image 210 that has metal artifacts. FIG. 12B shows image slice 68 corresponding to that of FIG. 12A following metal artifacts reduction using the methods of the present disclosure.

Consistent with one embodiment, the present invention utilizes a computer program with stored instructions that perform on image data accessed from an electronic memory. As can be appreciated by those skilled in the image processing arts, a computer program of an embodiment of the present invention can be utilized by a suitable, generalpurpose computer system, such as a personal computer or workstation. However, many other types of computer systems can be used to execute the computer program of the present invention, including networked processors. The computer program for performing the method of the present invention may be stored in a computer readable storage medium. This medium may comprise, for example; magnetic storage media such as a magnetic disk such as a hard drive or removable device or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the internet or other communication medium. Those skilled in the art will readily recognize that the equivalent of such a computer program product may also be constructed in hardware.

It should be noted that the term "memory", equivalent to "computer-accessible memory" in the context of the present disclosure, can refer to any type of temporary or more enduring data storage workspace used for storing and operating upon image data and accessible to a computer system, including a database. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Displaying an image requires memory storage. Display data, for example, is typically stored in a temporary storage buffer that is directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types.

It will be understood that the computer program product of the present invention may make use of various image manipulation algorithms and processes that are well known. It will be further understood that the computer program product embodiment of the present invention may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the present invention, are not specifically shown or described herein and may be selected from such algorithms, systems, hardware, components and elements known in the art.

In one embodiment, an extra-oral dental x-ray imaging system can include an x-ray source to generate x-rays for exposure of such x-rays to an object imaging area; an x-ray imaging device adapted to produce multiple 2D projections during at least part of the exposure; at least one path by which at least one of the x-ray source and imaging device revolves along a prescribed spline, the object imaging area being located somewhere between the x-ray source focal point and the x-ray imaging device; and a processing device to obtain outputs of the x-ray imaging device to compose a first 3-D-image using measured projection images, the dental x-ray imaging system further comprising means for forming a 3-D image metal mask that contains metal voxels in the first 3-D image; for each measured projection image, means for forming a projection metal mask that contains the pixels that are a projection of the 3-D image metal mask; means for forming a 3-D prior image that contains the voxels of the first 3-D image that are within the 3-D image metal mask and replacing voxel values of the first 3-D image that are outside the 3-D image metal mask with a value that is representative of air or soft tissue; means for iteratively modifying one or more of the non-metal voxels of the 3-D prior image according to a difference between a pixel value related to the nonmetal voxel in at least one measured projection image at a projection angle and the corresponding pixel value in at least one calculated projection image that is generated for the projection angle according to the 3-D prior image; means for forming a plurality of composite projection images, wherein each composite projection image is formed by replacing measured projection image data for pixels within the projection metal mask with calculated projection image data for the corresponding pixels; and means for reconstructing and displaying a metal artifact reduced 3-D image from the plurality of composite projection images. In one embodiment, the dental x-ray imaging system can include a CBCT system. In one embodiment, the processing device (e.g., hardware, software or combinations thereof) can perform the operations to implement exemplary methods/processes shown in FIGS. 3-8. In one embodiment, the processing device can form a 3-D image metal mask that contains metal voxels in the first 3-D image; form a projection metal mask that contains the pixels that are a projection of the 3-D image metal mask; form a 3-D prior image that contains the voxels of the first 3-D image that are within the 3-D image metal mask and replace voxel values of the first 3-D image that are outside the 3-D image metal mask with a value that is representative of air or soft tissue; iteratively modify one or more of the non-metal voxels of the 3-D prior image according to a difference between a pixel value related to the nonmetal voxel in at least one measured projection image at a projection angle and the corresponding pixel value in at least one calculated projection image that is generated for the projection angle according to the 3-D prior image; form a plurality of composite projection images, where each composite projection image is formed by replacing measured projection image data for pixels within the projection metal mask with calculated projection image data for the corresponding pixels; and reconstruct and/or display a metal artifact reduced 3-D image from the plurality of composite projection images.

While the invention has been illustrated with respect to one or more implementations, alterations and/or modifications can be made to the illustrated examples without departing from the spirit and scope of the appended claims. In addition, while a particular feature of the invention can have been disclosed with respect to one of several implementations, such feature can be combined with one or more other features of the other implementations as can be desired and advantageous for any given or particular function. The term "at least one of" is used to mean one or more of the listed items can be selected. The term "about" indicates that the value listed can be somewhat altered, as long as the alteration does not result in nonconformance of the process or structure to the illustrated embodiment. Finally, "exemplary" indicates the description is used as an example, rather than implying that it is an ideal. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for reducing metal artifacts in a volume radiographic image, the method executed at least in part on a computer and comprising:
    reconstructing a first 3-D-image using measured 2D projection images;
    forming a 3-D image metal mask that contains metal voxels in the first 3-D-image;
    for each measured 2D projection image, forward projecting the 3-D image metal mask to form a projection metal mask of pixels resulting therefrom in a corresponding 2D projection metal image;
    forming a metal obstruction 3-D map that indicates the extent to which each voxel in the first 3-D-image is obstructed by metal;
    forming a plurality of composite 2D projection images, wherein each composite 2D projection image is formed by modifying measured 2D projection image data for pixels for said each measured 2D projection image within the projection metal mask of the corresponding 2D projection metal image with calculated 2D projection image data for the corresponding pixels;
    reconstructing a metal artifact reduced 3-D image from the plurality of composite 2D projection images;
    modifying non-metal voxels in the metal artifact reduced 3-D image identified by the metal obstruction 3-D map, where the modified non-metal voxels include voxels that are not neighbors of the metal voxels;
    and
    displaying the modified metal artifact reduced 3-D image.

2. The method of claim 1 wherein modifying the one or more non-metal voxels of the metal artifact reduced 3-D image comprises computing differences between corresponding pixel values for a plurality of measured 2D projection images and a plurality of corresponding calculated 2D projection images and wherein the one or more non-metal voxels are modified two or more times.

3. The method of claim 1 further comprising forming a set of final calculated projection images using forward projection of the modified metal artifact reduced 3-D image.

4. The method of claim 1 in which the degree of metal obstruction of voxels in the first 3-D image is calculated and the modified non-metal voxels of the 3-D prior image are set according to this calculated value.

5. The method of claim 1 further comprising storing or transmitting the modified metal artifact reduced 3-D image.

6. The method of claim 1 further comprising displaying the first 3-D image along with the modified metal artifact reduced 3-D image.

7. A method for reducing metal artifacts in a volume radiographic image, the method executed at least in part on a computer and comprising:
    reconstructing a first 3-D-image using measured projection images;
    forming a 3-D image metal mask that contains metal voxels in the first 3-D image;
    for each measured projection image, forming a projection metal mask in a corresponding projection metal image by forward projecting the 3-D image metal mask;
    forming a plurality of composite projection images, wherein each composite projection image is formed by modifying measured projection image data for pixels for said each measured projection image within the projection metal mask of the corresponding projection metal image with calculated projection image data for the corresponding pixels;
    reconstructing a metal artifact reduced 3-D image from the plurality of composite projection images;
    identifying non-metal voxels in the metal artifact reduced 3-D image that are affected by metal attenuation in the measured projections;
    modifying the affected non-metal voxels in the metal artifact reduced reconstruction based on an amount of modification to the measured projections used to produce the composite projection, where the modified affected non-metal voxels include voxels that are not neighbors of the metal voxels;
    and
    displaying one or more portions of the modified metal artifact reduced 3-D image.

8. The method of claim 7 further comprising generating and storing a plurality of calculated projection images using forward projection of the modified metal artifact reduced 3-D image.

9. The method of claim 7 wherein the measured projection images are acquired from a cone-beam computed tomography system.

10. The method of claim 7 further comprising displaying one or more of the measured projection images, projection metal masks, or composite projection images.

11. The method of claim 7 further comprising generating a metal obstruction 3-D map that indicates the extent to which each voxel in the first 3-D image is obstructed by metal.

* * * * *